Jan. 5, 1960
C. J. CISLO
2,919,931
DUAL TRIM HEIGHT LEVELING VALVE MECHANISM FOR AIR SUSPENSION
Filed Aug. 1, 1958
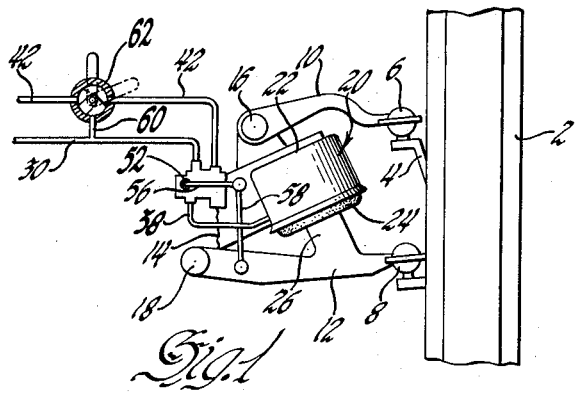
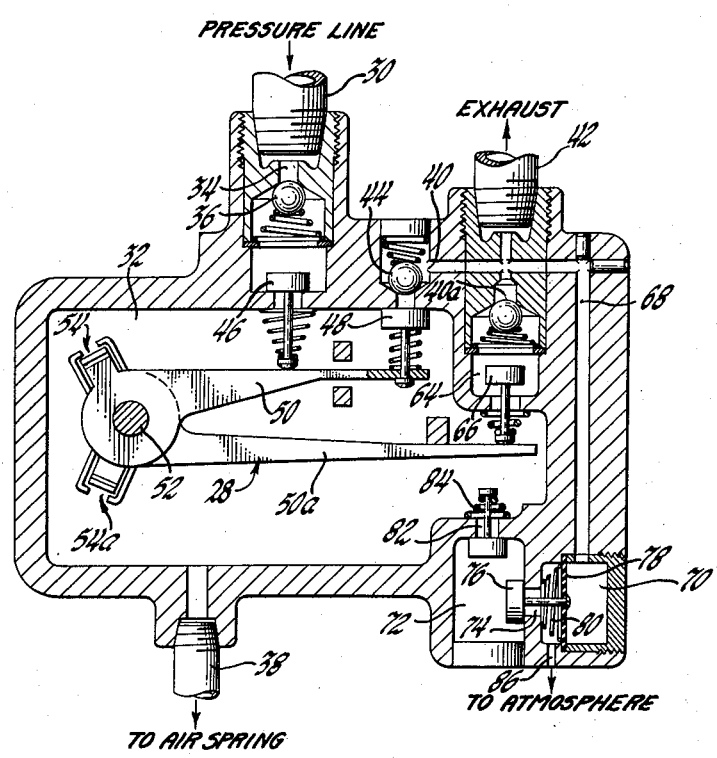
INVENTOR.
Casimer J. Cislo
BY
W. S. Pettigrew
ATTORNEY

United States Patent Office 2,919,931
Patented Jan. 5, 1960

2,919,931

DUAL TRIM HEIGHT LEVELING VALVE MECHANISM FOR AIR SUSPENSION

Casimer J. Cislo, Detroit, Mich., assignor to General Motors Corporation, Detroit, Mich., a corporation of Delaware Application August 1, 1958, Serial No. 752,663

9 Claims. (Cl. 280—124)

This invention relates to pneumatic suspension for vehicles and more particularly to apparatus for controlling the height clearance thereof.

An object of the present invention is to provide an improved pneumatic suspension system for vehicles.

Another object is to provide improved leveling means for air suspended vehicles.

A further object is to provide in a pneumatically suspended vehicle, control apparatus adapted to permit selection of two different road clearance heights.

A still further object is to provide a device of the type described which in either of the selected positions operates to automatically maintain the vehicle at the selected height regardless of changes in load.

Yet a further object is to provide a structure of the stated character in which selection of the desired height position is a function of alteration of the normal fluid flow circuit for the suspension system.

Still a further object is to provide a device of the stated clearance height upon introduction of high pressure air character which operates to provide an extended vehicle into the exhaust circuit of the system.

Still another object is to provide a dual trim height leveling valve assembly in which the extended trim height position is less than the maximum rebound position of the suspension structure.

These and other objects, advantages and features of the invention will become more fully apparent as reference is had to the accompanying specification and drawings wherein:

Fig. 1 is a schematic view showing the structural and fluid circuit relationship of the invention with respect to an air spring assembly associated with one wheel of a multiple wheeled vehicle; and Fig. 2 is an enlarged elevational view, partly in section and with parts broken away, illustrating the structure and relationship of the parts of the invention.

In Fig. 1 there is illustrated a portion of a vehicle suspension in which a wheel 2 is mounted for rotation on a wheel knuckle element 4, the upper and lower ends of which are connected by spherical joints 6 and 8 to the outer ends of a pair of vertically spaced upper and lower wishbone control arms 10 and 12. The inner ends of arms 10 and 12 are pivoted to the vehicle frame 14 on generally longitudinally extending axes 16 and 18. The frame 14 is resiliently suspended with respect to wheel 2 by means of an air spring assembly 20. Assembly 20 includes an inverted cup-shaped cylinder 22, a flexible bellows 24, and a piston element 26 rigidly supported on lower arm 12. The elastic medium provided by air confined in spring 20 is introduced and exhausted therefrom by operation of a leveling valve assembly 28 responsive to variation in vertical clearance between frame 14 and the ground upon which wheel 2 rests.

As seen best in Fig. 2, air supplied from a source of high pressure air, not shown, communicates via high pressure circuit 30 with the hollow interior 32 of leveling valve assembly 28 through a port 34 formed in the latter.

Disposed in port 34 is a check valve assembly 36 which prevents return movement of air from cavity 32 to high pressure circuit 30. Air exhausted from spring 20 enters cavity 32 through conduit 38 and passes to atmosphere via port 40 and exhaust conduit 42. Port 40 is provided with a check valve assembly 44 similar to check valve assembly 36 but biased in the opposite direction.

To control the movement of air into and out of spring 20 so as to maintain the sprung mass 14 at a predetermined normal trim height, intake port 34 has disposed therein a push-type intake valve 46, while port 40 is associated with a pull-type exhaust valve 48. Valves 46 and 48 are actuated by an arm 50 which is rotatably supported on a rocking shaft 52 carried by assembly 28. Arm 50 is arranged in impositive driving engagement with shaft 52 by means of a resilient connection 54 which functions to yieldably maintain the shaft 52 and arm 50 in a predetermined angular relation, yet allows relative angular movement therebetween when arm 50 reaches its mechanical limits of movement. Inasmuch as the construction of connection 54 forms no part of the present invention, detailed description thereof will be omitted. For a complete description of a construction of this type, reference may be had to U.S. Patent No. 2,844,384, George W. Jackson, entitled Control Apparatus for Fluid Suspension, assigned to General Motors Corporation.

Externally of valve assembly 28, shaft 52 has fixed thereto a lever 56 which, in turn, is connected to lower control arm 12 by a drop link 58. In operation, upward deflection of wheel 2 causes shaft 52 to rotate counterclockwise imparting similar angular movement to arm 50 which functions to displace valve 46 upwardly, permitting high pressure air to enter cavity 32 through port 34. As long as arm 50 remains in the upwardly deflected position, air passes from cavity 32 through conduit 38 into spring 20. As air pressure increases therein, arm 12 swings downwardly relative to frame 12 thereby imparting clockwise movement to shaft 52 through link 58 and lever 56 until arm 50 is returned to the normal horizontal position shown, at which time valve 46 resumes the closed position and prevents further introduction of air from circuit 30 to spring 20. Contrawise, if the frame 14 ascends above the normal level, shaft 52 is caused to rotate clockwise thereby unseating exhaust valve 48 and allowing air to move from spring 20 through conduit 38, cavity 32 and exhaust circuit 42 to atmosphere until the frame descends to a level returning arm 50 to the position shown.

In order to provide a second or extended trim height position, in accordance with one feature of the invention, the high pressure circuit 30 and exhaust circuit 42 are connected by a cross-flow conduit 60 which includes a cross-flow control valve assembly 62. When in the position shown in solid lines, control valve 62 operates to prevent cross flow between circuit 30 and 42, but when rotated to the position shown in dotted lines, valve 62 permits flow of air from circuit 30 into the portion of exhaust circuit 42 between valve 62 and leveling valve 28, while blocking the portion of exhaust circuit 42 to the left of valve 62. As a result, high pressure air enters both port 34 and 40 in leveling valve 28. Although intake valve 46 remains closed due to the position of arm 50, high pressure air is now free to pass through exhaust branch passage 40a into alternate intake port 64 past push-type valve assembly 66 into cavity 32 and thence to air spring 20. As seen in Fig. 2, alternate intake valve assembly 66 is actuated by an arm 50a which is rotatably mounted on shaft 52 for impositive driven engagement in the same manner as described with reference to arm 50. Like arm 50, arm 50a is normally biased to a predetermined angular position by resilient connection 54a, with the result that arms 50 and 50a normally lie in generally parallel relation. Accordingly, arm 50a normally maintains alternate intake valve 66 in an unseated position when the vehicle is at normal trim height. Hence, when the cross-flow control valve 62 is operated to the position shown in dotted lines, valve 66 is already in open position and introduction of high pressure air into spring 20 occurs immediately. As high pressure air is introduced to spring 20 through port 64, frame 14 ascends with respect to control arm 12 thereby imparting clockwise motion to both arm 50 and arm 50a. As arm 50a swings downwardly, valve 66 is allowed to seat closing off the intake port 64. Although exhaust valve 48 is now displaced to open position due to concurrent downward movement of arm 50, air may not exhaust therethrough due to the fact that the pressure in circuit 42 is equal to the high pressure line pressure and is, therefore, greater than the pressure inside cavity 32. As a result, check valve 44 is maintained in closed position.

In accordance with another feature of the invention, valve assembly 28 contains an auxiliary passage 68 communicating with port 40 and circuit 42. Passage 68 leads to a cavity 70 which, in turn, communicates with a second cavity 72 via a port 74. Disposed in port 74 is a valve assembly 76 which is normally spring biased to closed position. Partitioning cavity 70 and connected to valve 76 is a diaphragm 78 which acts under the influence of increased pressure supplied through passage 68 to unseat valve 76 against the action of spring 80 as long as control valve 62 is in the position shown in dotted lines. Extending between cavity 32 and cavity 72 is a port 82 in which is disposed a push-type valve 84, which functions to provide an alternative exhaust passage to atmosphere from spring 20 when for any reason the frame 12 exceeds the predetermined extended trim height. Thus, upon the occurrence of excessive upward displacement of the sprung mass, actuator arm 50a is caused to swing downwardly and displace alternate exhaust valve 84 permitting air from cavity 32 to enter cavity 72 through port 82 and proceed therefrom through passage 74 to the portion of cavity 70 left of the diaphragm, and escape therefrom to atmosphere through passage 86.

Upon restoring cross-flow control valve 62 to its normal position, the pressure in exhaust circuit 42 returns to the normal approximately atmospheric pressure, which relieves the pressure on diaphragm 78 and allows spring 80 to return valve 76 to the closed position. Since actuator arm 50 is also downwardly displaced with arm 50a, the normal exhaust valve 48 is in a downwardly displaced position while high pressure air in cavity 32 now exerts an unseating force on check valve 44 and passes to atmosphere through exhaust conduit 42 until the quantity of air in spring 20 has been reduced sufficiently to cause the frame 14 to descend to the level wherein arm 50 resumes the horizontal position shown, at which time normal exhaust valve 48 returns to closed position. Thereafter, leveling with reference to the normal trim height is controlled exclusively by operation of intake valve 46 and exhaust valve 48, as previously described. Although during normal trim functioning the sprung mass of the vehicle may on occasion ascend sufficiently to cause opening of both exhaust valve 48 and alternate exhaust valve 84 by arms 50 and 50a, respectively, under such circumstances, air is exhausted exclusively through passage 40 to exhaust circuit 42. This results from the absence of pressure in passage 62 which allows diaphragm actuated valve 76 to block escape of air through atmosphere passage 80. Consequently, minimum loss of air occurs when the invention is used in a closed or semi-closed system wherein exhaust air is normally returned to pressure generating source. It will, of course, be understood that when the invention is utilized in a full open system passage 68 and diaphragm actuated valve 76 may be omitted without impairing the dual leveling function of the invention.

While but one embodiment of the invention has been shown and described, it will be apparent that other changes and modifications may be made therein It is, therefore, to be understood that it is not intended to limit the invention to the embodiment shown, but only by the scope of the claims which follow.

I claim:

1. In combination, an air spring having two relatively displaceable members, an air intake circuit, an air exhaust circuit, control means for selectively connecting said circuits in either independent or communicating relation, a leveling valve assembly connected to said circuits between said control means and said spring, said leveling valve including intake and exhaust closures, closure actuating means movable responsive to variation in displacement of said members so as to maintain said spring displacement at a first predetermined distance, additional closure means associated with said exhaust circuit, additional actuating means movable with said intake and exhaust closure actuating means, said additional closure means operating responsive to movement of said additional actuating means to establish and maintain said spring displacement at a second predetermined distance when said intake and exhaust circuits are in communicating relation, and means responsive to introduction of intake air into said exhaust circuit effective to prevent movement of intake air past said exhaust closure.

2. In combination, an air spring having two relatively displaceable members, an air intake circuit, an air exhaust circuit, control means for selectively connecting said circuits in either independent or communicating relation, a leveling valve assembly connected to said circuits between said control means and said spring, said leveling valve including an intake and an exhaust passage opening into a main cavity, closure means for said passages, closure actuating means in said cavity movable responsive to variation in displacement of said spring members so as to maintain said spring displacement at a first predetermined distance, additional closure means associated with said exhaust circuit, additional actuating means movable with said intake and exhaust closure actuating means, said additional closure means operating responsive to movement of said additional actuating means to increase said spring displacement to a second predetermined distance when said intake and exhaust circuits are in communicating relation, means responsive to introduction of intake air into said exhaust circuit effective to prevent movement of intake air past said first mentioned exhaust closure, an alternate exhaust passage, and closure means for said passage movable to passage opening position by said additional actuating means when said second predetermined spring clearance is exceeded.

3. In a device of the class described, a leveling valve assembly comprising a housing having a main cavity, a fluid intake passage and a fluid exhaust passage communicating with said cavity, closure means associated with each of said passages, swingable operating means mounted in said cavity adapted to displace said intake and exhaust closure, respectively, upon predetermined angular movement in opposite directions from a neutral position, a branch passage associated with said exhaust passage and communicating with said main cavity, a closure member adapted to close said branch passage upon angular movement of said operating means in excess of said predetermined movement in the direction displacing said exhaust closure, a passage providing communication between said cavity and atmosphere, and a closure for said passage adapted to open said passage upon still further movement of said arm in said direction.

4. Air spring control apparatus comprising a valve body having a main cavity, a first pair of intake and exhaust passages, closure means for each passage, a second pair of intake and exhaust passages, closure means for each of said last mentioned passages, a shaft rotatably mounted in said housing, a first arm mounted on said shaft and movable therewith to actuate said first mentioned closures, a second arm mounted on said shaft and movable therewith to operate said second mentioned closures, said second intake passage being arranged in communication with said first exhaust passage, and pressure responsive means in said first exhaust passage blocking flow therefrom to said cavity during operation of said second mentioned closures.

5. Air spring control apparatus comprising a valve body having a main cavity, a first pair of intake and exhaust passages, closure means for each passage, a second pair of intake and exhaust passages, closure means for each of said last mentioned passages, a shaft rotatably mounted in said housing, a first arm impositively mounted on said shaft and movable therewith to actuate said first mentioned closures, a second arm impositively mounted on said shaft and movable therewith to operate said second mentioned closures, said second intake passage being arranged in communication with said first exhaust passage, and pressure responsive means in said first exhaust passage blocking flow therefrom to said cavity during operation of said second mentioned closures.

6. Air spring control apparatus comprising a valve body having a main cavity, a first pair of intake and exhaust passages, closure means for each passage, a second pair of intake and exhaust passages, closure means for each of said last mentioned passages, a shaft rotatably mounted in said housing, a first arm impositively mounted on said shaft and movable therewith through a first angular range to actuate said first mentioned closures, a second arm impositively mounted on said shaft and movable therewith through a second angular range to operate said second mentioned closures, said second intake passage being arranged in communication with said first exhaust passage, pressure responsive means in said first exhaust passage blocking flow therefrom to said cavity during operation of said second mentioned closures, and additional pressure responsive means in said first exhaust passage for controlling flow from said second exhaust passage to atmosphere.

7. In a device of the class described, a leveling valve comprising a housing having a main cavity, a fluid intake passage and a fluid exhaust passage communicating with said cavity, closure means associated with each of said passages, an operating arm mounted in said cavity adapted to displace said intake closure and exhaust closure, respectively, upon movement through a first angular range in opposite directions from a first neutral position, a branch passage associated with said exhaust passage and communicating with said main cavity, closure means associated with said branch passage, a passage extending between said cavity and atmosphere, a closure for said last mentioned passage, a second operating arm movable with said first arm adapted to displace one or the other of said last mentioned closures, respectively, upon movement through a second angular range in opposite direction from a neutral position angularly displaced from said first neutral position, a normally closed valve in one of said branch passages, and means responsive to pressure increase in said exhaust passage for opening said normally closed valve.

8. In a device of the class described, a leveling valve comprising a housing having a main cavity, a fluid intake passage and a fluid exhaust passage communicating with said cavity, closure means associated with each of said passages, an operating arm mounted in said cavity adapted to displace said intake closure and exhaust closure, respectively, upon movement through a first angular range in opposite directions from a first neutral position, a pair of branch passages associated with said exhaust passage and communicating with said main cavity, closure means associated with each of said branch passages, a second operating arm movable with said first arm adapted to displace one or the other of said last mentioned closure means, respectively, upon movement through a second angular range in opposite directions from a second neutral position, a normally closed valve in one of said branch passages blocking flow therefrom to atmosphere, and means responsive to pressure increase in said exhaust passage for opening said normally closed valve.

9. The structure set forth in claim 8 wherein said means responsive to pressure increase comprises a diaphragm element disposed between said branch passage and said exhaust passage.

References Cited in the file of this patent

UNITED STATES PATENTS 2,844,385    Pribonic               July 22, 1958